May 5, 1925.
W. H. THIEMER
1,536,986
PACKING FOR SPLINE CONNECTIONS OF UNIVERSAL JOINTS AND THE LIKE
Filed May 12, 1921
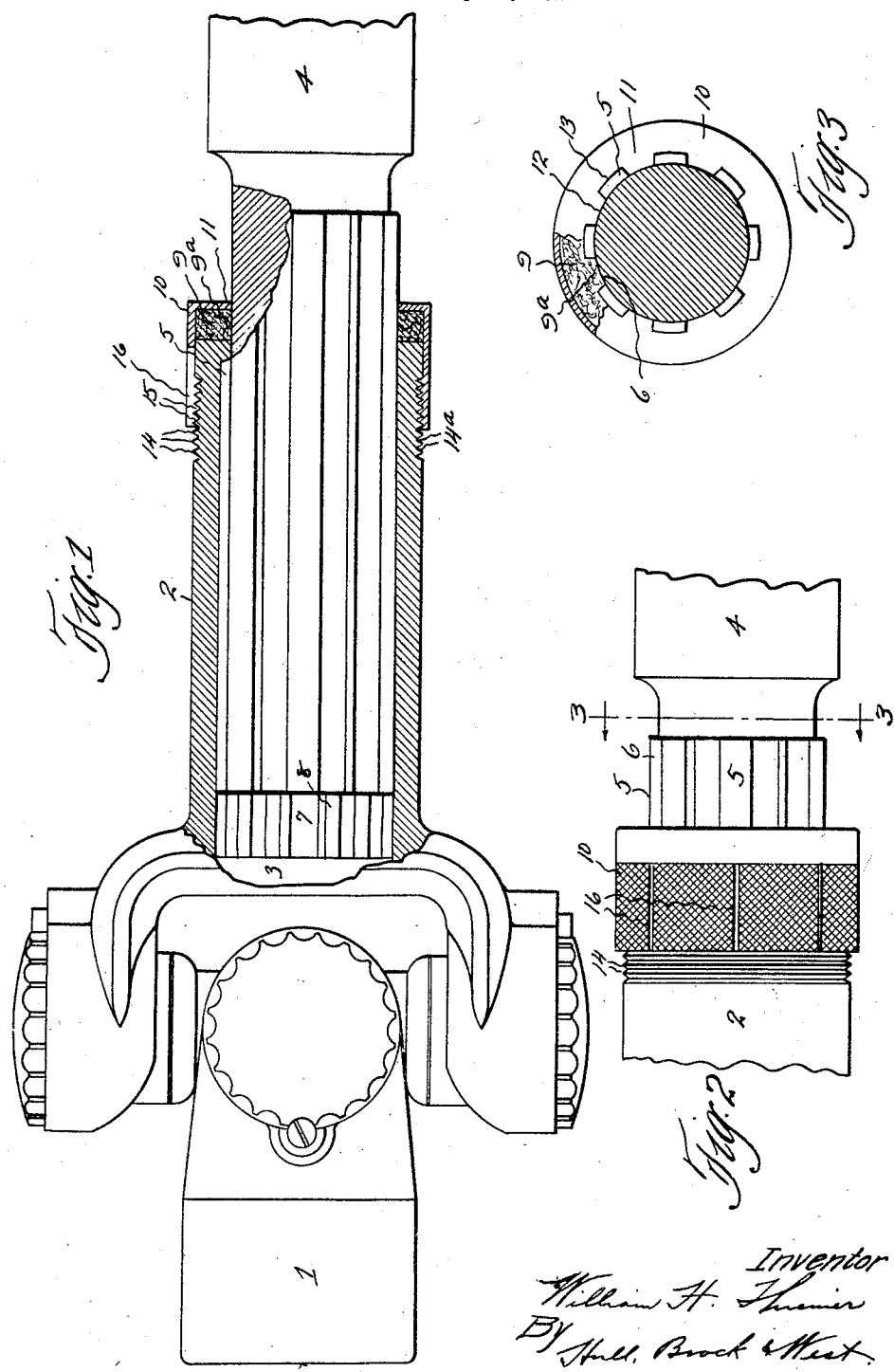
Inventor
William H. Thiemer
By Hull, Brock & West
Attys.

Patented May 5, 1925.

1,536,986

UNITED STATES PATENT OFFICE.

WILLIAM H. THIEMER, OF CLEVELAND, OHIO, ASSIGNOR TO HIMSELF, FREDERICK W. PETERS, AND J. H. WILLS, ALL OF CLEVELAND, OHIO.

PACKING FOR SPLINE CONNECTIONS OF UNIVERSAL JOINTS AND THE LIKE.

Application filed May 12, 1921. Serial No. 468,816.

*To all whom it may concern:*

Be it known that I, WILLIAM H. THIEMER, a citizen of the United States, residing at Cleveland, in the county of Cuyahoga and State of Ohio, have invented a certain new and useful Improvement in Packings for Spline Connections of Universal Joints and the like, of which the following is a specification, reference being had to the accompanying drawings.

This invention relates to universal joints and more particularly to the spline connection between the hub of one of the members of such joints and its shaft. The general object of the invention is to provide a spline connection between such hub and shaft which will not only prevent leakage of lubricant, but which will enable this result to be secured in a particularly efficient and economical manner. I accomplish the foregoing objects in and through the construction illustrated in the drawings, wherein Fig. 1 represents a view, partly in section and partly in elevation, of a universal joint having my spline connection with its shaft end; Fig. 2 a detail in elevation of the end of the hub and the cooperating portion of the shaft; and Fig. 3 a sectional view corresponding to the line 3—3 of Fig. 2, with certain parts broken away.

Describing the various parts by reference characters, 1 denotes one of the hubs and 2 the other hub of a universal joint of any standard construction. The hub 2 is closed at its inner end, thereby forming a chamber 3 for lubricant. This hub is mounted upon the end of the shaft 4, the shaft end being provided with ribs 5 having grooves 6 therebetween, the said grooves and ribs interfitting with corresponding grooves 7 and ribs 8 within the interior of the hub 2 and forming a spline connection therewith.

For the purpose of preventing the leakage or escape of lubricant from the hub 2, I provide a washer 9 of compressible material (preferably fibrous) the said washer being formed with projections 9a adapted to enter the recesses between the ribs 5 and to substantially fill such recesses.

For the purpose of securing this washer in place and of compressing it from time to time, as may be necessary, to prevent leakage, I provide a sleeve or cap 10 having an inwardly projecting flange 11 at its outer end, which flange is adapted to contact the washer 9 and is provided with alternating projections 12 and recesses 13 cooperating respectively with the recesses 6 and ribs 5 of the hub end.

In order to permit of the convenient adjustment of the sleeve 10 and to retain it in such adjusted position, the hub 2 is provided near the rear end thereof, with a number of closely spaced peripheral ribs 14, and the inner end of the sleeve is provided in its interior with corresponding ribs 15 adapted to engage the grooves or recesses 14a between the ribs 14. To facilitate the adjustment of the sleeve 10 upon the hub 2, the sleeve is provided with slots 16 extending rearwardly from its front or inner end, the slots terminating short of the rear end of the sleeve and being spaced from such rear end by more than the thickness of the washer 9.

By the construction described and illustrated herein, lubricant in the chamber 3 and slots 6 will be prevented from leaking beyond the rear end of the hub by means of the washer 9 which is compressed between the flange 11 and the rear end of the hub. This leakage is prevented, not only by the compression of the washer but by the shape thereof, the said washer fitting closely between and around the ribs 5, and filling the slots or recesses therebetween.

Should it be necessary to compress the washer, this result may be accomplished by pushing or pulling the sleeve 10 toward the hub 2, thereby moving the sleeve bodily along the hub, the inwardly projecting ribs 15 riding over the ribs 14 and snapping in place within the grooves or recesses 14a and serving to lock the said sleeves in washer-compressing engagement with the hubs.

By the use of my invention I am able to employ a compressible washer to prevent the leakage of lubricant from the ends of splined hubs and to compress such washers with the employment of a single adjustable member.

Having thus described my invention, what I claim is:—

1. The combination, with a shaft having a plurality of ribs extending longitudinally thereof and recesses between such ribs, of a hub surrounding the said shaft and having ribs and recesses complementary to those upon the shaft, a washer of compressible material upon the shaft and shaped to fit the ribs and recesses thereof, and means connected to said hub and contacting with the said washer and the projections thereof within the recesses on the shaft, for compressing the said washer against the end of said hub.

2. The combination, with a shaft having a plurality of ribs extending longitudinally thereof and recesses between such ribs, of a hub surrounding the said shaft and having ribs and recesses complementary to those upon the shaft, a washer of compressible material upon the shaft and shaped to fit the ribs and recesses thereof, and a cap adjustably mounted upon the said hub and having an annular flange and projections adapted to enter the recesses between the said ribs and contacting with the washer.

3. The combination, with a shaft having a plurality of ribs extending longitudinally thereof and recesses between such ribs, of a hub surrounding the said shaft and having ribs and recesses complementary to those on the shaft, a washer of compressible material upon the shaft and shaped to fit the ribs and recesses of said shaft, and a longitudinally split cap having inwardly projecting ribs cooperating with ribs upon the said hub and having an annular flange with projections adapted to enter the recesses between the said ribs, the said flange and ribs serving, by the adjustment of said cap along said hub, to compress the said washer against the end of the hub adjacent thereto.

4. The combination, with a shaft having a plurality of ribs extending longitudinally thereof and recesses between such ribs, of a hub surrounding the said shaft and having ribs and recesses complementary to those on the shaft, a washer of compressible material upon the shaft and shaped to fit the ribs and recesses of said shaft, and a flanged cap having inwardly projecting ribs near the open end thereof cooperating with ribs upon the said hub and having slots extending from the open end thereof toward the said flange, the distance from the ends of said slots to said flange being greater than the thickness of the said washer, and the said flange having projections adapted to enter the recesses in said shaft.

In testimony whereof, I hereunto affix my signature.

WILLIAM H. THIEMER.